United States Patent
Ljung et al.

(10) Patent No.: US 10,206,165 B2
(45) Date of Patent: Feb. 12, 2019

(54) SYSTEM, METHOD, AND COMPUTER PROGRAM PRODUCT FOR ENABLING A MACHINE TYPE COMMUNICATION (MTC) COVERAGE ENHANCEMENT MODE

(71) Applicant: Sony Corporation, Tokyo (JP)

(72) Inventors: Rickard Ljung, Helsingborg (SE); Peter C. Karlsson, Lund (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 21 days.

(21) Appl. No.: 14/565,849

(22) Filed: Dec. 10, 2014

(65) Prior Publication Data
US 2016/0157169 A1    Jun. 2, 2016

Related U.S. Application Data

(63) Continuation of application No. PCT/EP2014/075914, filed on Nov. 28, 2014.

(51) Int. Cl.
*H04W 48/18* (2009.01)
*H04W 88/02* (2009.01)
*H04W 8/22* (2009.01)

(52) U.S. Cl.
CPC .............. *H04W 48/18* (2013.01); *H04W 8/22* (2013.01); *H04W 88/02* (2013.01)

(58) Field of Classification Search
CPC ....... H04W 48/20; H04W 48/18; H04W 8/22; H04W 88/02

(Continued)

(56) References Cited

U.S. PATENT DOCUMENTS 8,873,419 B2 *  10/2014  Soomro ................ H04W 48/18
                                                    370/252
2012/0182938 A1 *  7/2012  Mujtaba ................ H04W 88/06
                                                    370/328

(Continued)

FOREIGN PATENT DOCUMENTS

WO    WO 2014000157 A1 *  1/2014  .......... H04W 76/007
WO    2014109684 A1    7/2014
WO    2014118761 A1    8/2014

OTHER PUBLICATIONS

International Search Report and Written Opinion; dated Sep. 2, 2015; issued in International Patent Application No. PCT/EP2014/075914.

*Primary Examiner* — Kamran Afshar
*Assistant Examiner* — Majid Syed
(74) *Attorney, Agent, or Firm* — Tucker Ellis LLP; Ross Kowalski; Morris Galin

(57) ABSTRACT

The invention is directed to systems, methods and computer program products for switching to a machine type communication (MTC) coverage enhancement mode on a network. An exemplary method comprises determining a signal quality for a signal from the network; determining the signal quality is below a threshold quality level for using Long-Term Evolution (LTE) protocol to communicate with the network; in response to determining the signal quality is below the threshold quality level, switching the device to the MTC mode and communicating with the network using MTC specification of the LTE protocol, wherein the device comprises a non-MTC device.

11 Claims, 3 Drawing Sheets

(58) Field of Classification Search
USPC .......................................... 370/329; 455/517
See application file for complete search history.

(56) References Cited

U.S. PATENT DOCUMENTS

| | | | |
|---|---|---|---|
| 2013/0115993 A1* | 5/2013 | Jain | H04W 76/02 455/517 |
| 2014/0185548 A1* | 7/2014 | Lee | H04W 48/20 370/329 |
| 2014/0341141 A1* | 11/2014 | Nguyen | H04W 16/14 370/329 |
| 2015/0085717 A1* | 3/2015 | Papasakellariou | H04L 5/14 370/280 |
| 2015/0264511 A1* | 9/2015 | Rashid | H04W 4/005 370/329 |
| 2016/0338005 A1* | 11/2016 | Lim | H04W 4/70 |

* cited by examiner

SYSTEM, METHOD, AND COMPUTER PROGRAM PRODUCT FOR ENABLING A MACHINE TYPE COMMUNICATION (MTC) COVERAGE ENHANCEMENT MODE

BACKGROUND

Network access may be inferior in certain places or at certain times. Inferior network access negatively affects user experience on a device that is attempting to connect to the network. There is a need to address such situations of inferior network access.

BRIEF SUMMARY

Embodiments of the invention are directed to systems, methods and computer program products for switching a device to a machine type communication ("MTC") coverage enhancement mode on a network. An exemplary method comprises determining a signal quality for a signal from the network; determining the signal quality is below a threshold quality level for using Long-Term Evolution ("LTE") protocol to communicate with the network; and in response to determining the signal quality is below the threshold quality level, switching the device to the MTC mode and communicating with the network using MTC specification of the LTE protocol, wherein the device comprises a non-MTC device. As used herein, communicating with the network using the MTC specification of the LTE protocol does not require disconnecting an existing LTE connection to the network; instead, it merely implies switching the mode of communicating with the network on the existing LTE connection to the network.

In some embodiments, the signal quality is determined by the device.

In some embodiments, the signal quality is determined by the network.

In some embodiments, the non-MTC device comprises at least one of a mobile computing device, a non-mobile computing device, a mobile phone, a television, a watch, or a tablet computing device.

In some embodiments, the method further comprises in response to determining the signal quality is below the threshold quality level, determining that the device cannot communicate with the network using the LTE protocol.

In some embodiments, the network is associated with a standardization specified by the $3^{rd}$ Generation Partnership Project ("3GPP").

In some embodiments, the MTC mode is specified in the standardization.

In some embodiments, switching the device to the MTC mode triggers the device to be usable for emergency access.

In some embodiments, a coverage area associated with the MTC specification is greater than a coverage area associated with the LTE protocol.

In some embodiments, the method further comprises in response to determining the signal quality is not below the threshold quality level, communicating with the network using the LTE protocol.

In some embodiments, the method further comprises registering the device as a MTC device.

In some embodiments, the method further comprises determining whether the device is capable of camping on the network using the LTE protocol.

In some embodiments, the method further comprises in response to determining the device is not capable of camping on the network using the LTE protocol, switching the device to the MTC mode and communicating with the network using the MTC specification of the LTE protocol.

In some embodiments, the method further comprises the device comprises an application module and cellular modem.

In some embodiments, an apparatus is provided for switching to MTC coverage enhancement mode on a network. The apparatus comprises a memory; a processor; and a module stored in the memory, executable by the processor, and configured to: determine a signal quality for a signal from the network; determine the signal quality is below a threshold quality level for using LTE protocol to communicate with the network; in response to determining the signal quality is below the threshold quality level, switch the apparatus to the MTC mode and communicate with the network using MTC specification of the LTE protocol, wherein the apparatus comprises a non-MTC apparatus.

In some embodiments, the apparatus further comprises a cellular modem.

In some embodiments, the switching functionality is incorporated into the cellular modem.

In some embodiments, the apparatus further comprises an application module, wherein the switching functionality is not incorporated into the application module.

In some embodiments, the apparatus further comprises an application module, wherein the switching functionality is incorporated into the application module.

In some embodiments, a computer program product is provided for switching an apparatus to MTC coverage enhancement mode on a network. The computer program product comprises a non-transitory computer-readable medium comprising a set of codes for causing a computer to determine a signal quality for a signal from the network; determine the signal quality is below a threshold quality level for using LTE protocol to communicate with the network; in response to determining the signal quality is below the threshold quality level, switch the apparatus to the MTC mode and communicate with the network using MTC specification of the LTE protocol, wherein the apparatus comprises a non-MTC apparatus.

BRIEF DESCRIPTION OF THE DRAWINGS

Figure 1:
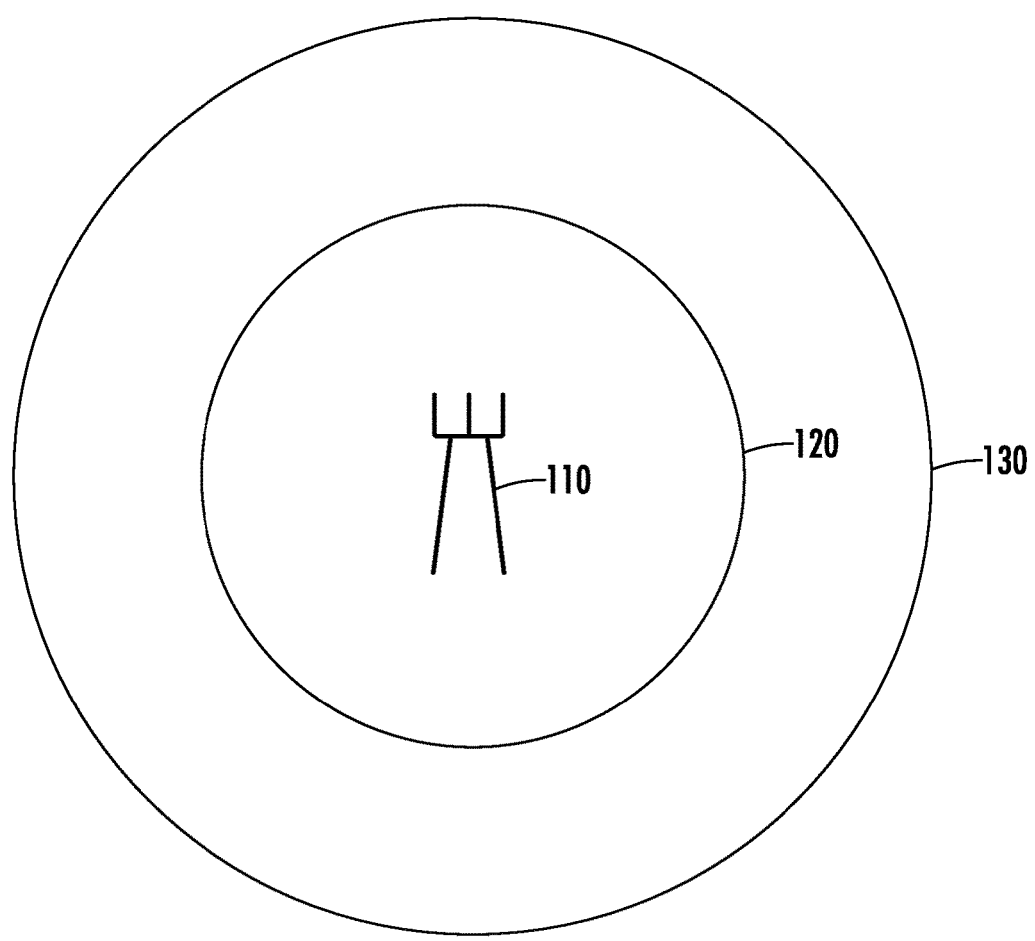
Figure 2A:
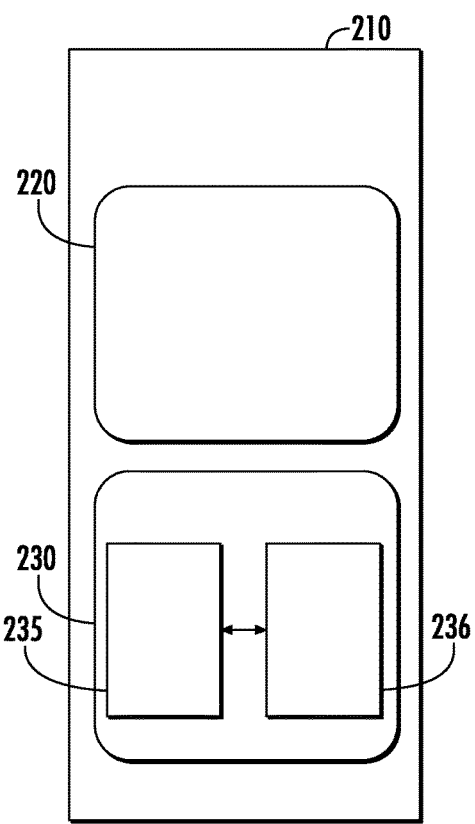
Figure 2B:
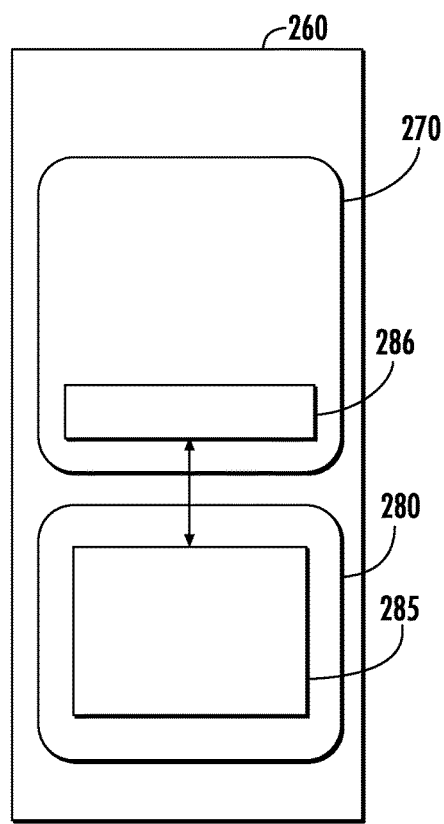
Figure 3:
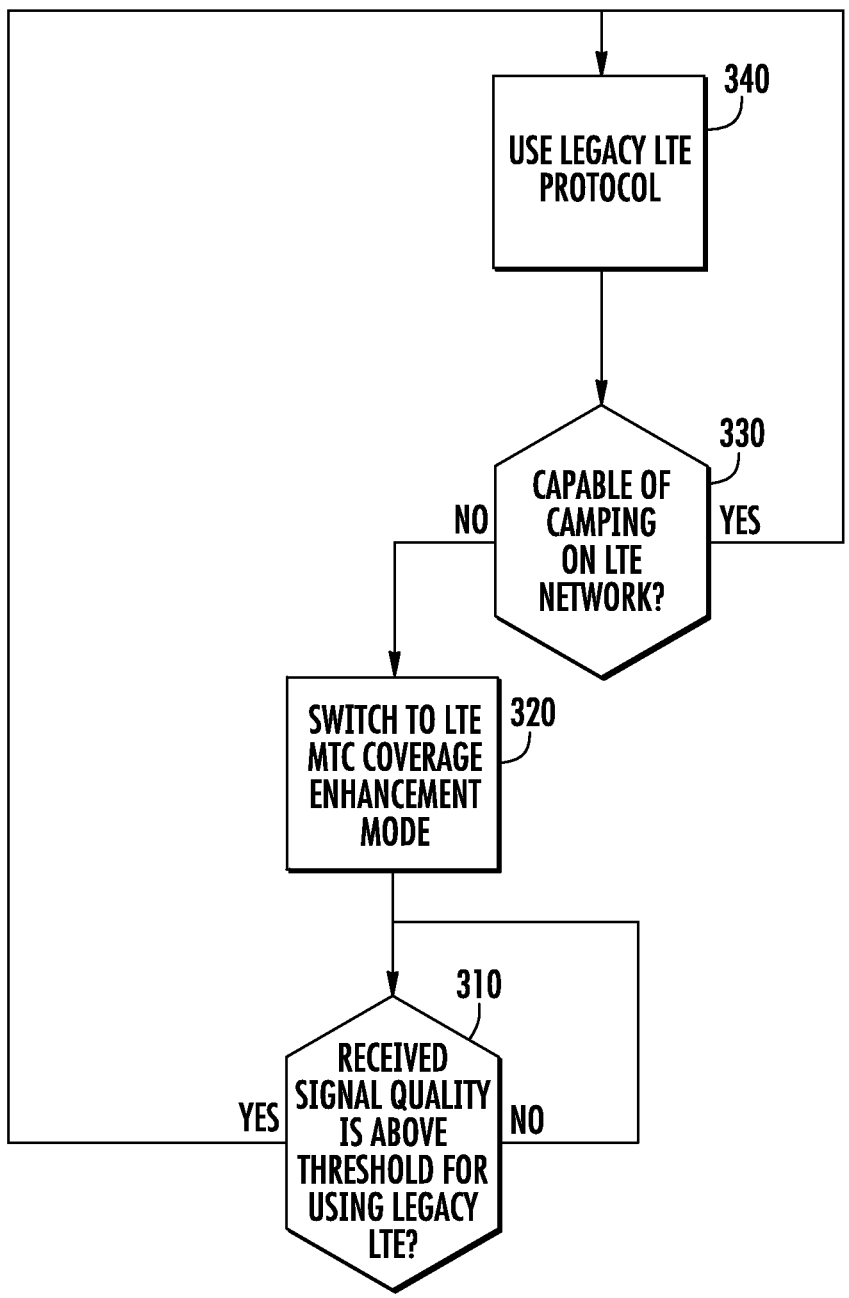

Having thus described embodiments of the invention in general terms, reference will now be made to the accompanying drawings, where:

FIG. 1 is an exemplary coverage area, in accordance with embodiments of the present invention;

FIGS. 2A and 2B are exemplary device implementations, in accordance with embodiments of the present invention;

FIG. 3 is an exemplary method for switching to MTC coverage enhancement mode, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment ("UE"). For the purpose of sending or receiving data, the device may connect to a wireless local area network ("WLAN") or a cellular network (including evolution of 3GPP) LTE releases and $5^{th}$ Generation ("5G") LTE releases). Any network described herein may have one or more base stations ("BS") and/or access points ("AP").

In coming releases of the 3GPP LTE specification, a separate operation mode will be specified, targeting MTC. MTC refers to machines being able to communicate with each other without human intervention or enablement. An objective for this operation mode is to handle low data rate communication (e.g., less than a threshold data rate). Mobile device chipsets that support this separate operation mode can be produced at a lower cost compared to mobile device chipsets that support the current 3GPP LTE standard. MTC enables enhanced coverage on a network. The present invention incorporates protocol changes that improve the effective link budget (on the order of ~10 dB) for network control channels, thereby improving the probability of a device being within a coverage area of a network (e.g., an LTE network).

An MTC device is a type of device (e.g., a sensor, a measurement system, etc.) that is equipped for MTC or machine-to-machine ("MTM") communication. The functionality described herein can be incorporated into any non-MTC device (e.g., a smartphone, a tablet, or any other mobile device) such that the device can specifically request network access using the MTC mode or enhanced coverage mode. A non-MTC device is a device that requires human intervention or enablement for establishing communication with another device. Therefore, the present invention enables a non-MTC device to communicate over a network where normal network access (i.e., legacy LTE access) is unavailable due to inferior network coverage.

The present invention enables non-MTC capable devices to utilize a 3GPP MTC coverage enhancement mode for improved network coverage. As described below, the MTC coverage enhancement mode may be used for emergency access in some embodiments. Emergency access refers to a situation where a device can establish communication with or receive communication from selected recipients. In some embodiments, an emergency access scenario may be invoked when the network utilization for a selected area becomes equal to or greater than a threshold access level. This may happen immediately after a major incident associated with a particular area (e.g., a fire in a building). In some embodiments, in an emergency access scenario that triggers an emergency access mode on the device, the device may be limited to certain applications (e.g., the device may be able to initiate communication with or receive communication requests from a predetermined list of recipients). The invention is not limited to coverage enhancement only in an emergency access scenario, and may be applicable to any scenario where a wider coverage area is needed by the device.

Referring now to FIG. 1, FIG. 1 illustrates a coverage situation addressed by the present invention. FIG. 1 illustrates network coverage related to the distance from a base station 110 (e.g., an LTE base station) to a device. The legacy LTE coverage area 120 is smaller than the MTC enhanced coverage area 130. A device may be able to access the network (i.e., establish a radio link to the base station) within the coverage area, and cannot access the network outside the perimeter of the coverage area. Using the same mobile device, the enhanced coverage MTC protocol allows for a worse link budget in order to access the network (i.e., the base station). The present invention allows for any device (e.g., LTE device) to include functionality for utilizing the MTC mode. However, in some embodiments, restrictions may apply to the usage of the MTC mode, e.g., the MTC mode is to be used for emergency services only.

As described previously, the present invention proposes a modification to 3GPP specification. The modification will specify that any device category will be allowed to utilize the protocol setup as specified for MTC. The modification will additionally specify that MTC protocol can be used for enhanced coverage situations. Further restrictions may be applied to the specification, e.g., a restriction that a non-MTC device may not utilize MTC protocol except for certain situations (e.g., emergency situations), or that the non-MTC device may be required to switch to ordinary LTE functionality in case the measured radio link quality is equal to or greater than a threshold quality level. Radio link quality refers to the quality of the link between the device and the network. This threshold quality level could be signaled by the network, and it may be coupled to a hysteresis parameter to avoid a ping-pong effect. The ping-pong effect refers to a situation where a device continually switches between multiple APs associated with the network.

Referring now to FIGS. 2A and 2B, these figures illustrate implementation of the present invention in a device. Within the device, the functionality can be implemented either directly as part of the cellular modem (FIG. 2A), or both in the cellular modem and in the operating system within the application domain (FIG. 2B). FIG. 2A illustrates a device 210 comprising an application module 220 and a cellular modem 230. In FIG. 2A, the application module 220 is not modified to support MTC capability, but the cellular modem 230 is modified to support MTC capability. The cellular modem 230 has both legacy LTE and MTC capability 235, and an MTC mode switching module 236 enables switching to and from the MTC mode.

FIG. 2B illustrates a device 260 comprising an application module 270 and a cellular modem 280. In FIG. 2B, the application module 270 is modified such that the MTC mode switching module 286 is incorporated into the application module 270. The cellular modem 280 is also modified such that the cellular modem 280 has both legacy LTE and MTC capability 285. Each of the devices 210 and 260 also includes a communication interface, a memory, and a processor (not shown in the figures). The application module 220 or 270 is stored in the memory, executable by the processor, configured to interact with the cellular modem 230 or 280 and perform the various processes described herein.

Referring now to FIG. 3, FIG. 3 presents a process flow for enhanced coverage MTC access within a device. At block 310, the device (or alternatively the network) determines whether the signal quality experienced by the device is equal to or greater than a threshold quality level for communicating with the network using LTE protocol. If the signal quality experienced by the device is equal to or greater than the threshold quality level, the device uses LTE protocol for accessing or communicating with the network (block 340). Using LTE protocol comprises activating physical circuitry associated with the LTE protocol. If the signal quality experienced by the device is not equal to or greater than the threshold quality level, the device uses the LTE MTC coverage enhancement mode for accessing or communicating with the network (block 320). Using LTE MTC coverage enhancement mode comprises activating physical circuitry associated with the LTE MTC coverage enhancement mode. In some embodiments, the physical circuitry associated with the LTE protocol is different from that associated with the LTE MTC coverage enhancement mode. At block 330, while using the LTE protocol for accessing the network, the device (or alternatively the network) determines whether the device is capable of camping on the network using LTE protocol (i.e., whether the device is capable of maintaining continuous unbroken access to the network for a predetermined period of time). If the device is capable of camping on the network using LTE protocol, the device continues to use LTE protocol for accessing or communicating with the network (block 340). If the device is incapable of camping on the network using LTE protocol, the device switches to using the LTE MTC coverage enhancement mode for accessing or communicating with the network (block 320). The features described in FIG. 3 can be implemented in a non-MTC device regardless of whether or not the MTC specification is included in the LTE protocol.

As an example, a device using LTE functionality may not be able to access a network due to inferior network quality (i.e., a radio link between the device and the network is below a threshold quality level). The device may directly determine the inferior network quality, or the network may transmit quality metrics to the device that enables the device to determine the inferior network quality. The device may trigger its modem (or the network may trigger the device to trigger its modem) to switch to a MTC coverage enhancement mode based on the MTC specification in the LTE protocol. The device will need to implement portions (e.g., all portions) of the MTC specification. For example, the device will need to register as a MTC device.

The invention is not limited to any particular types of devices (either MTC devices or non-MTC devices). As used herein, a device may also be referred to as a UE, a system, or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for switching a device to a machine type communication (MTC) coverage enhancement mode on a network, the method comprising:
   determining that the device is incapable of maintaining continuous access to the network using Long-Term Evolution (LTE) protocol for a predetermined period of time; and
   in response to determining that the device is incapable of maintaining continuous access to the network using Long-Term Evolution (LTE) protocol for the predetermined period of time, switching the device from an LTE protocol mode to the MTC coverage enhancement mode by activating an enhanced coverage MTC protocol and communicating with the network using the enhanced coverage MTC protocol,
   wherein the device comprises a non-MTC device including a cellular modem and an application module and the switching functionality is incorporated into the application module.

2. The method of claim 1, further comprising in response to determining that a signal quality received from the network is above a threshold level for using the LTE protocol, switching the device from the MTC coverage enhancement mode to the LTE protocol mode.

3. The method of claim 1, wherein the signal quality is determined by one of the device or the network.

4. The method of claim 1, wherein the device comprises at least one of a mobile computing device, a non-mobile computing device, a mobile phone, a television, a watch, or a tablet computing device.

5. The method of claim 1, wherein the network is associated with a standardization specified by the $3^{rd}$ Generation Partnership Project (3GPP).

6. The method of claim 5, wherein the MTC coverage enhancement mode is specified in the standardization.

7. The method of claim 1, wherein switching the device to the MTC coverage enhancement mode triggers the device to be usable solely for emergency access.

8. The method of claim 1, wherein a coverage area associated with the enhanced coverage MTC protocol is greater than a coverage area associated with the LTE protocol.

9. The method of claim 1, further comprising in response to switching the device to the MTC coverage enhancement mode, registering the device as a MTC device.

10. An apparatus for switching to a machine type communication (MTC) coverage enhancement mode on a network, the apparatus comprising:
    a memory;
    a processor;
    a cellular modem in communication with the processor;
    an application module stored in the memory and executable by the processor; and
    a module stored in the memory, executable by the processor, and configured to:
       determine that the apparatus is incapable of maintaining continuous access to the network using Long-Term Evolution (LTE) protocol for a predetermined period of time, and
       in response to determining that the apparatus is incapable of maintaining continuous access to the network using Long-Term Evolution (LTE) protocol for the predetermined period of time, switching the apparatus from an LTE protocol mode to the MTC coverage enhancement mode by activating an enhanced coverage MTC protocol and communicating with the network using the enhanced coverage MTC protocol, wherein the apparatus comprises a non-MTC apparatus, wherein the switching functionality is incorporated into the application module.

11. A computer program product for switching an apparatus comprising a cellular modem and an application module to a machine type communication (MTC) coverage enhancement mode on a network, the computer program product comprising:

a non-transitory computer-readable medium comprising a set of codes for causing a computer to:

determine that the apparatus is incapable of maintaining continuous access to the network using Long-Term Evolution (LTE) protocol for a predetermined period of time; and in response to determining that the apparatus is incapable of maintaining continuous access to the network using Long-Term Evolution (LTE) protocol for the predetermined period of time, switching the apparatus from a LTE protocol mode to the MTC coverage enhancement mode by, activating an enhanced coverage MTC protocol and communicating with the network using the enhanced coverage MTC protocol, wherein the apparatus comprises a non-MTC apparatus, wherein the switching functionality is incorporated into the application module.

* * * * *